Figure 1:
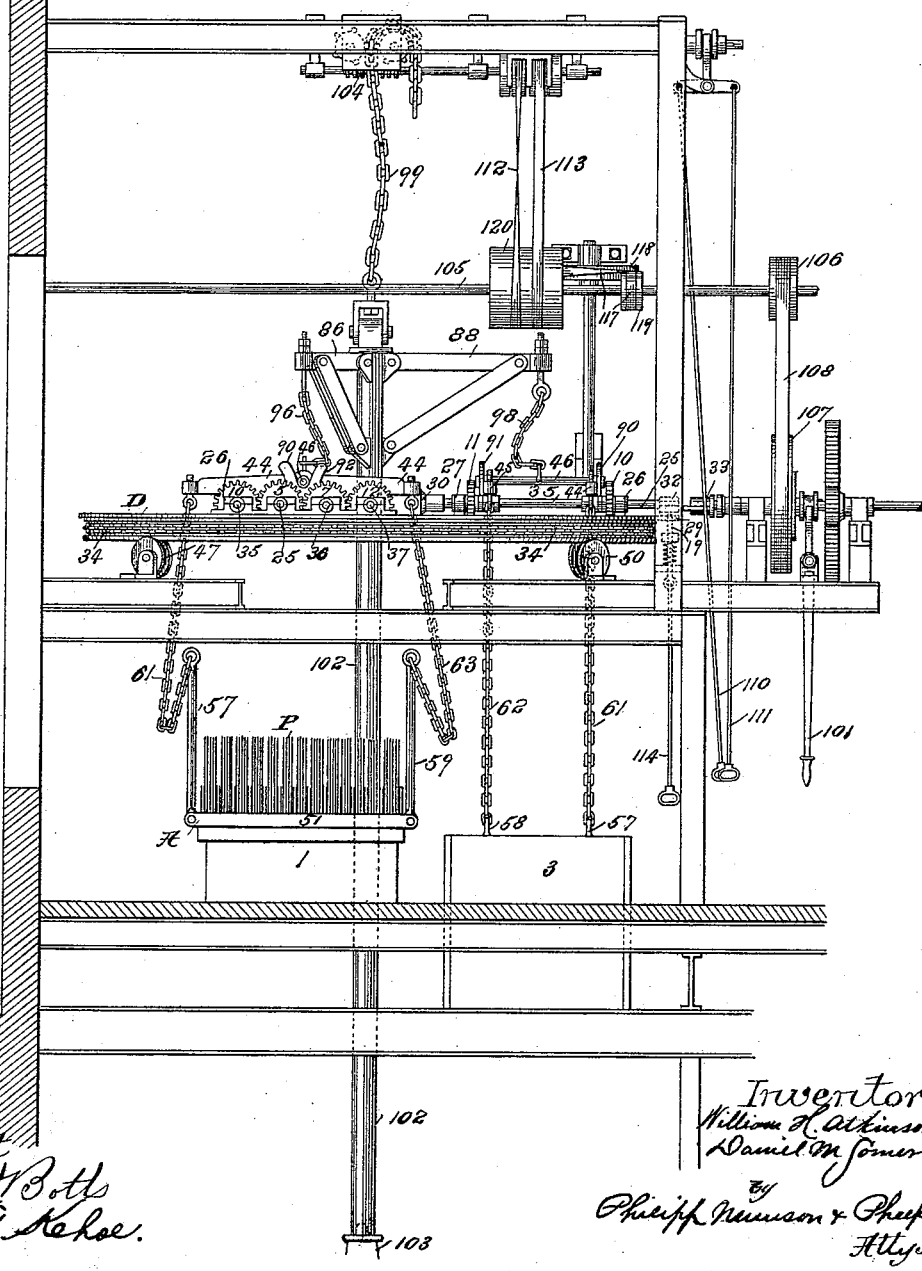

(No Model.)  7 Sheets—Sheet 2.

W. H. ATKINSON & D. M. SOMERS.
APPARATUS FOR PICKLING METAL PLATES.

No. 473,106. Patented Apr. 19, 1892.

(No Model.) 7 Sheets—Sheet 3.
W. H. ATKINSON & D. M. SOMERS.
APPARATUS FOR PICKLING METAL PLATES.
No. 473,106. Patented Apr. 19, 1892.
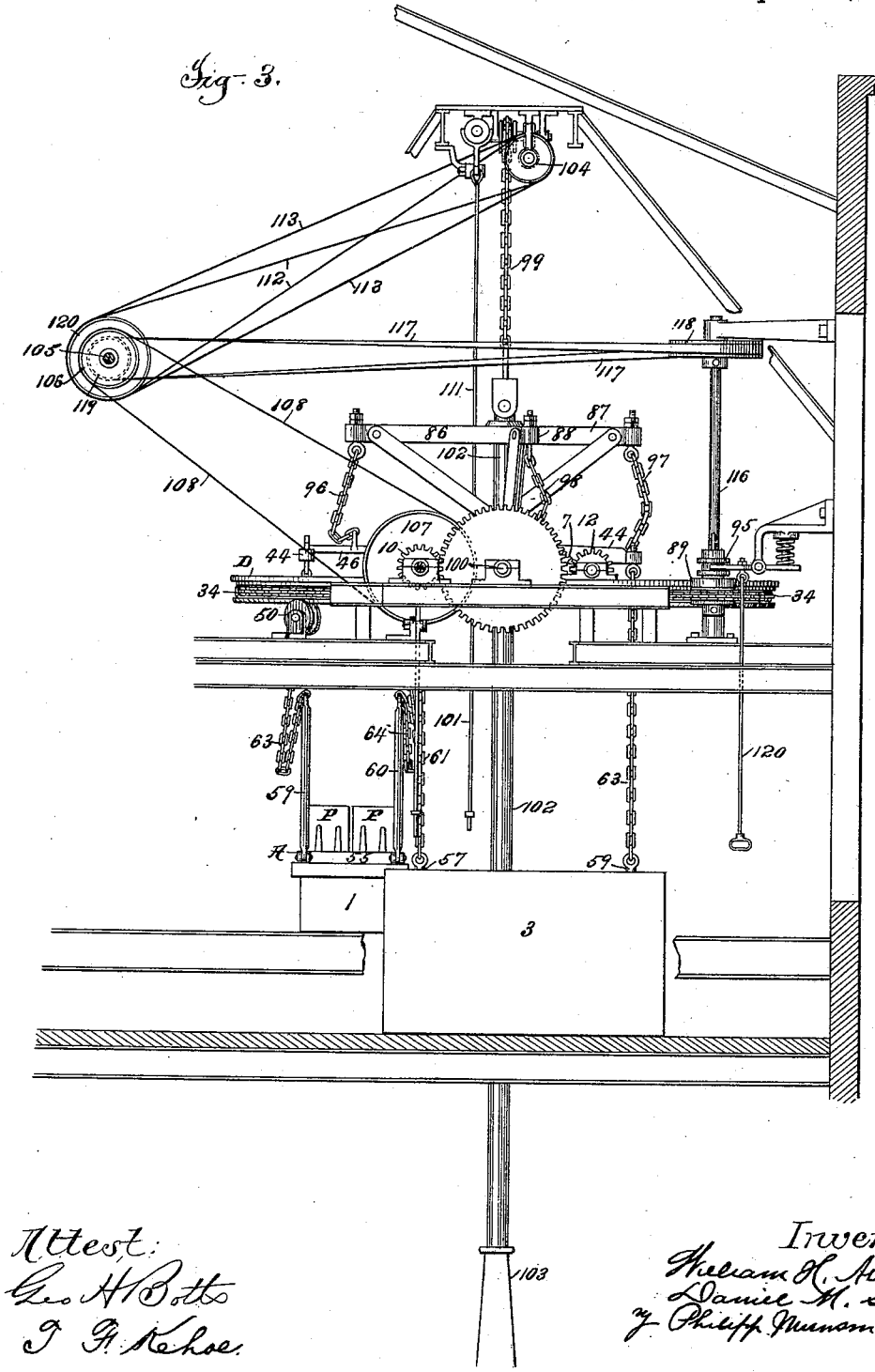

(No Model.) 7 Sheets—Sheet 4.
W. H. ATKINSON & D. M. SOMERS.
APPARATUS FOR PICKLING METAL PLATES.
No. 473,106. Patented Apr. 19, 1892.
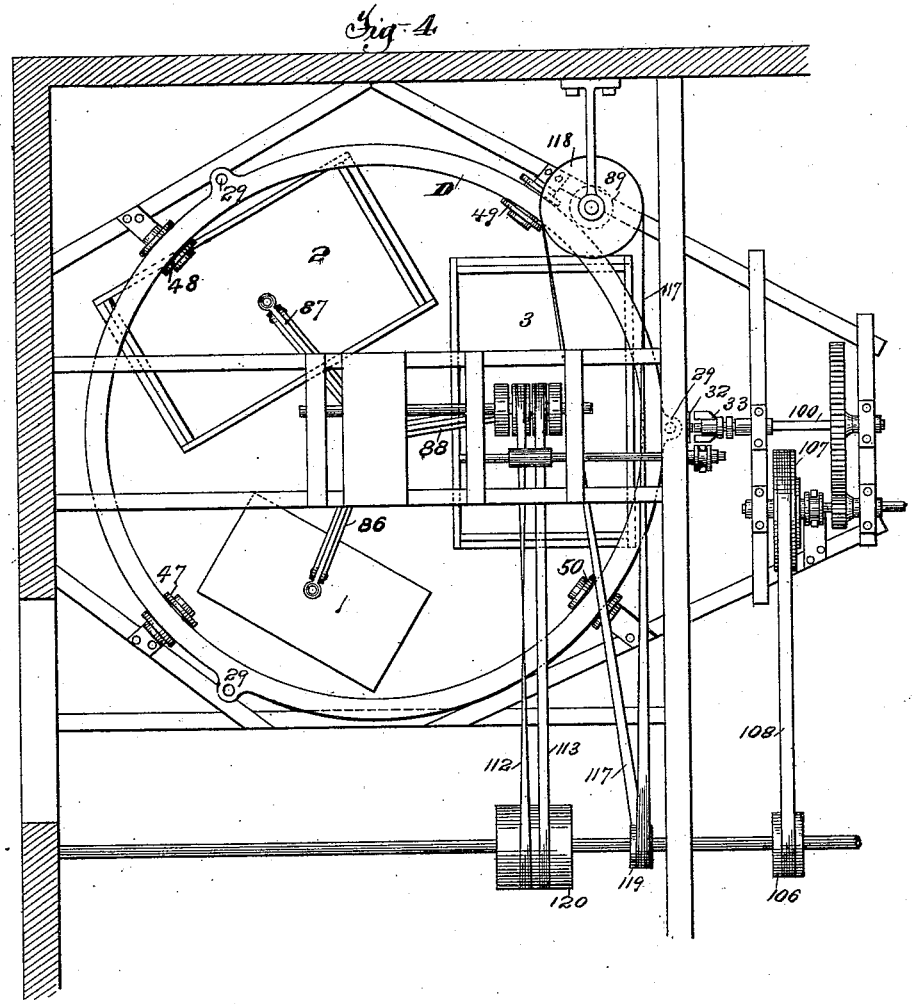
Attest:
Geo H Botts.
J F Kehoe.
Inventors
William H. Atkinson
Daniel M Somers
by
Phieff Inman & Phelps
Attys (No Model.) 7 Sheets—Sheet 5.
W. H. ATKINSON & D. M. SOMERS.
APPARATUS FOR PICKLING METAL PLATES.
No. 473,106. Patented Apr. 19, 1892.
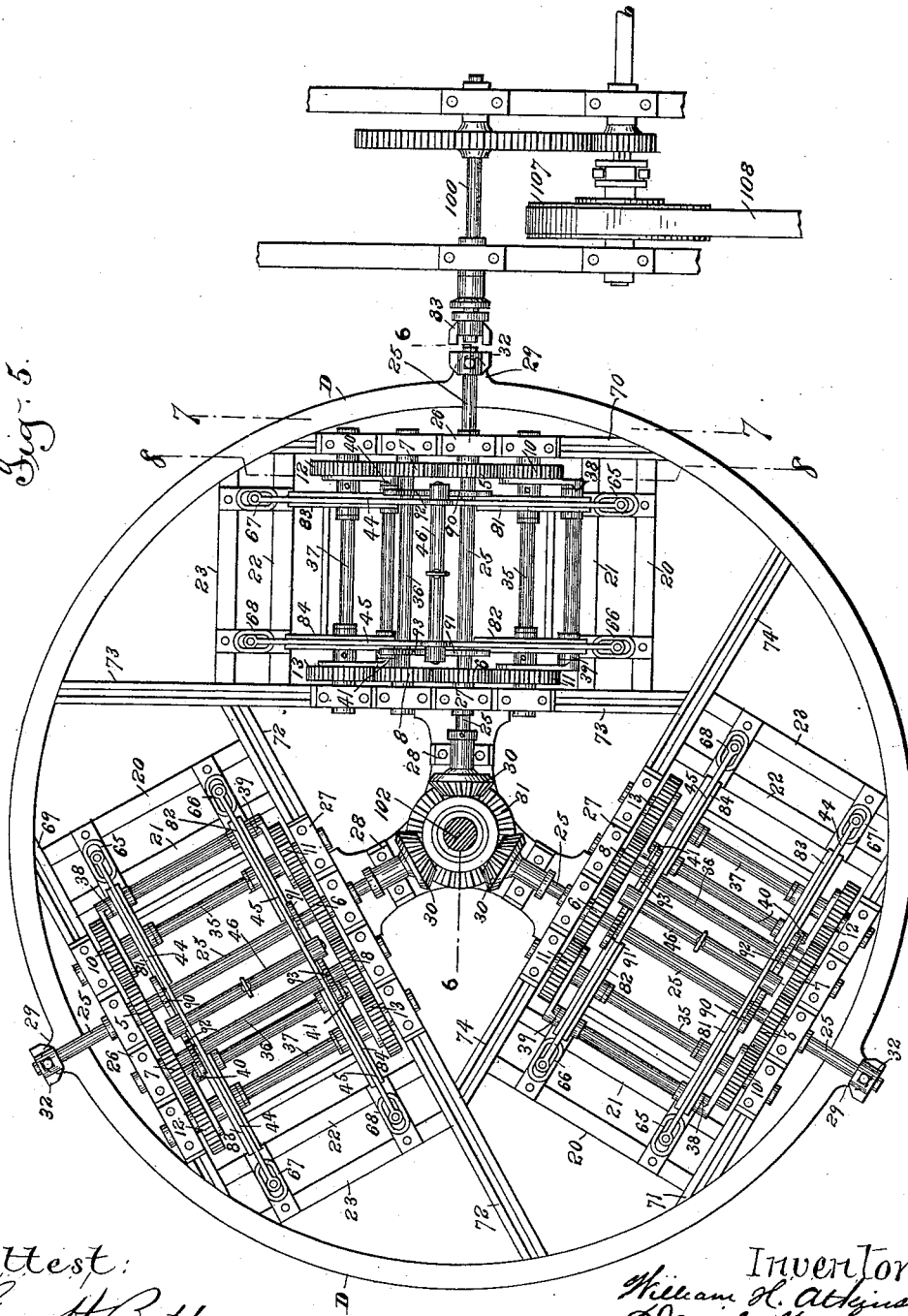
Attest:
Geo H Bott
J. F. Kehoe.
Inventors
William H. Atkinson
Daniel M. Somers
by
Attys (No Model.) 7 Sheets—Sheet 6.
W. H. ATKINSON & D. M. SOMERS.
APPARATUS FOR PICKLING METAL PLATES.
No. 473,106. Patented Apr. 19, 1892.
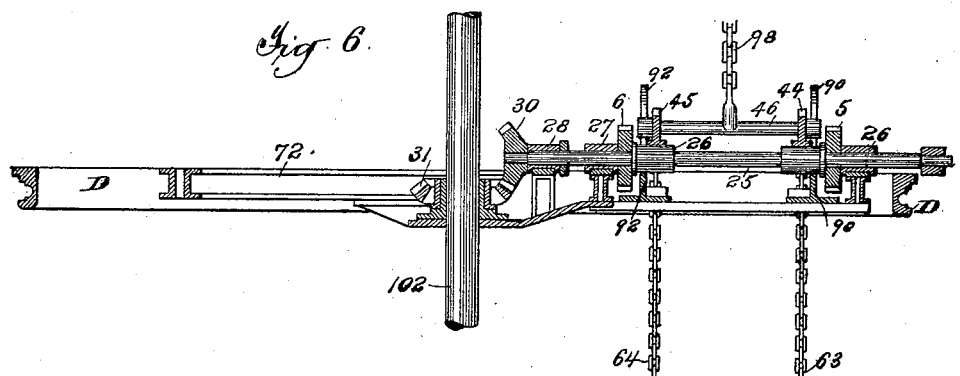
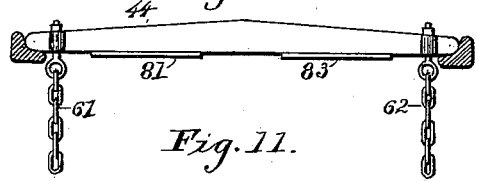
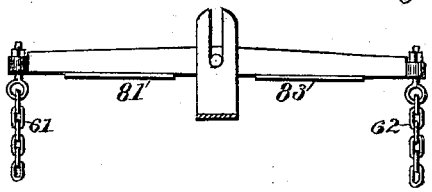
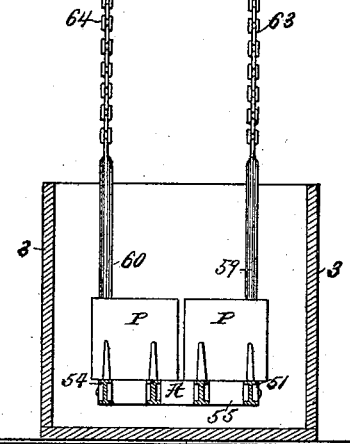
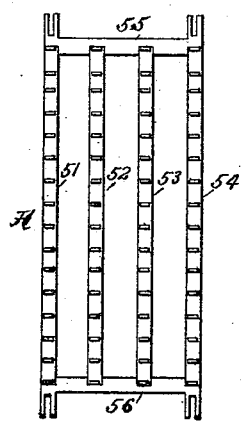
Attest:
Geo. H. Botts.
J. F. Kehoe.
Inventors
William H. Atkinson
Daniel M. Somers
by
Philip L. Munson & Phelps
Attys
THE NORRIS PETERS CO., PHOTO-LITHO., WASHINGTON, D. C.

(No Model.) 7 Sheets—Sheet 7.
W. H. ATKINSON & D. M. SOMERS.
APPARATUS FOR PICKLING METAL PLATES.
No. 473,106. Patented Apr. 19, 1892.
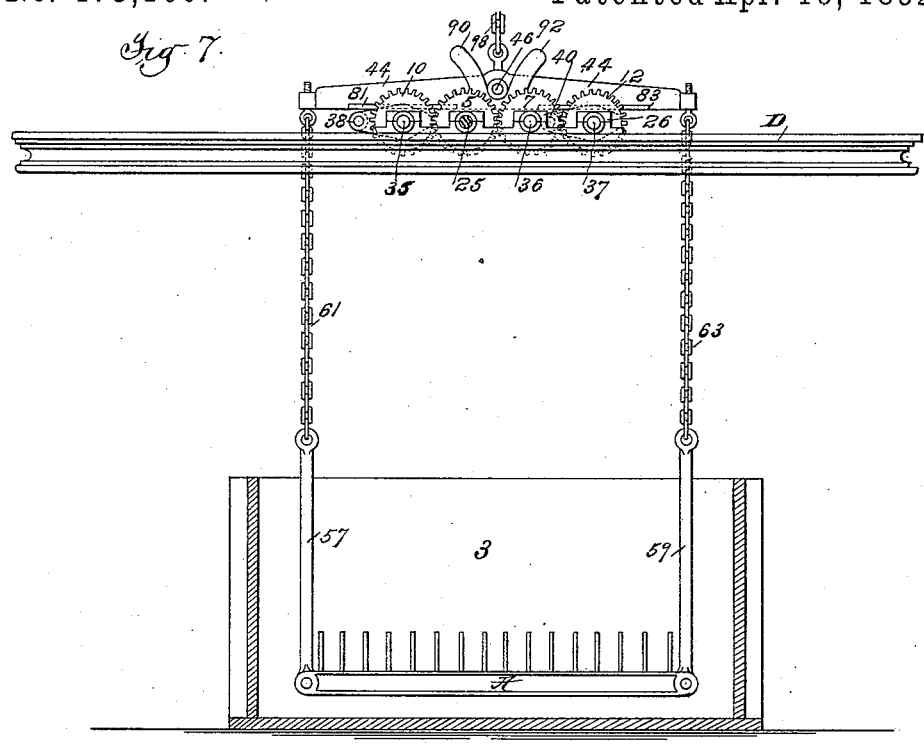
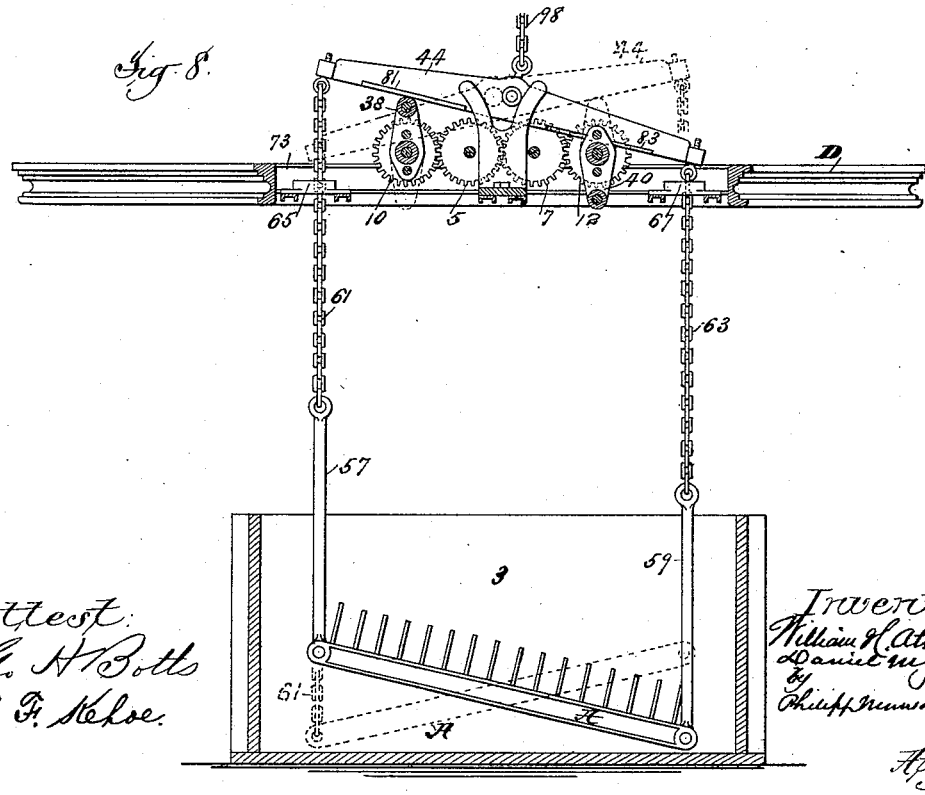
THE NORRIS PETERS CO., PHOTO-LITHO., WASHINGTON, D. C.

UNITED STATES PATENT OFFICE.

WILLIAM H. ATKINSON AND DANIEL M. SOMERS, OF BROOKLYN, NEW YORK.

APPARATUS FOR PICKLING METAL PLATES.

SPECIFICATION forming part of Letters Patent No. 473,106, dated April 19, 1892.

Application filed August 6, 1891. Serial No. 401,821. (No model.)

*To all whom it may concern:*

Be it known that we, WILLIAM H. ATKINSON and DANIEL M. SOMERS, citizens of the United States, residing in the city of Brooklyn, county of Kings, and State of New York, have invented certain new and useful Improvements in Apparatus for Pickling Metal Plates, fully described and represented in the following specification and the accompanying drawings, forming a part of the same.

This invention relates to that class of machines in which sheets of rolled metal are subjected to an acidulated bath for the purpose of removing from them such surface imperfection as may impair their final finish by planishing or coating them with tin, other metals, or alloys of metal.

In the art to which these improvements relate it follows, from the low price at which the plates must be produced and from the necessity of treating them in large quantities, that each operation performed upon them shall be expeditious in order to secure cheapness of production, and since the pickling operation in an acidulated bath is essential to all subsequent operations it is equally necessary that it shall not only be speedily done, but effectively accomplished, so as to perfectly prepare the plates for their subsequent treatment. To accomplish the removal of the oxide, scale, and other surface imperfections due to the nature of the material or resulting from its being reduced by rolling into thin plates, it is requisite not only that the plates shall be immersed in an acidulated bath, but shall be so thoroughly and violently agitated therein as to speedily detach any scale that may have formed upon the surface and remove all imperfections that can affect their final finish, it being necessary that they shall have a clean metal surface planished by smooth chilled rolls, so that all parts of their surface shall come into contact with and have proper affinity for tin, lead, or other alloy in the coating operation.

To this end the invention consists in an apparatus for effecting the pickling and washing operation, in which peculiar means and combinations of devices are provided for agitating the plates in the baths to which they are subjected and in peculiar means and combinations of parts by which the plates in large quantities are speedily manipulated and subjected to the said baths and introduced and removed from the apparatus, all of which is so specifically hereinafter described and claimed as not to require any other than this general description herein.

A practical embodiment of the improvements is illustrated in the drawings, in which—

Figure 2:
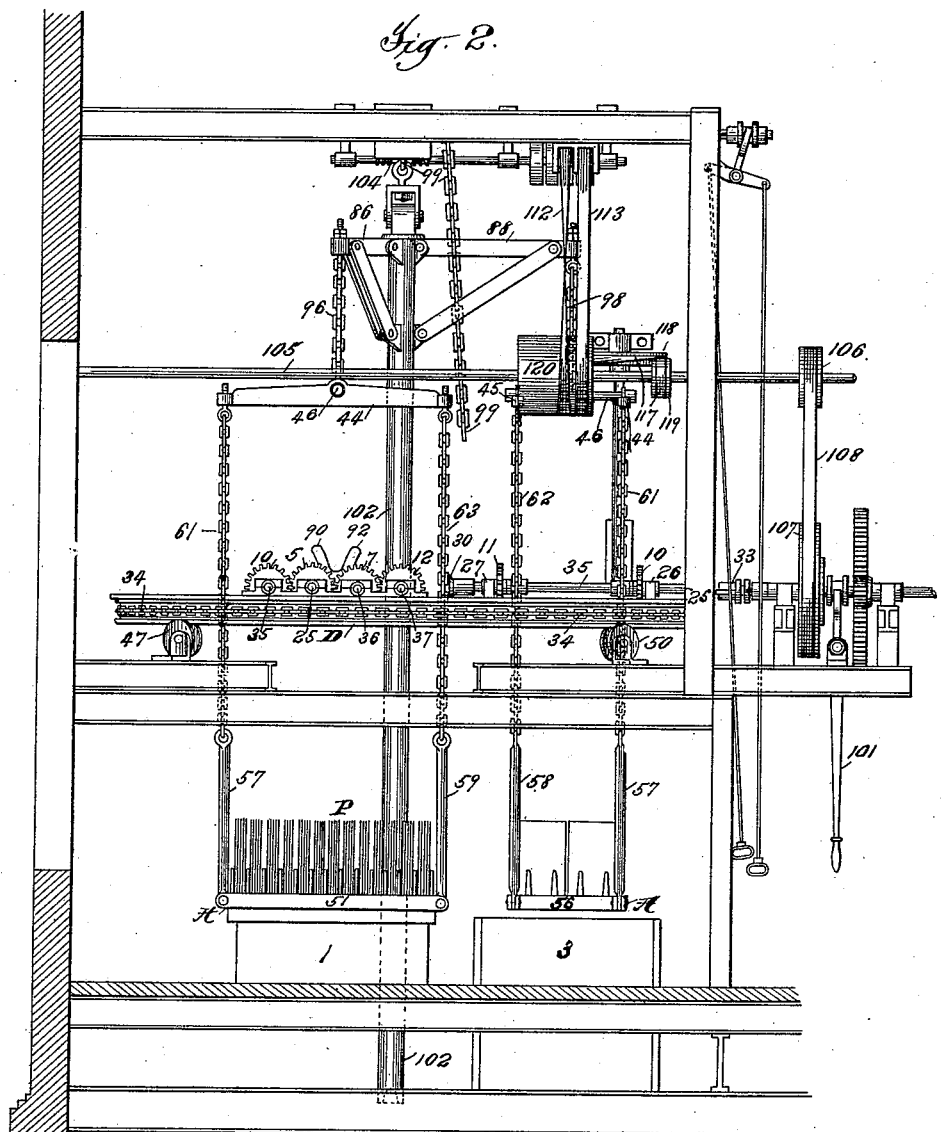

Figures 1 and 2 are front elevations showing the parts in two positions; Fig. 3, a side elevation, and Fig. 4 a plan view of the apparatus, while Fig. 5 shows a plan view, and Fig. 6 a sectional elevation on the line 6 6 of Fig. 5. Fig. 7 is a sectional elevation on line 7 7 of Fig. 5, and Fig. 8 a sectional elevation on line 8 8 of Fig. 5, showing particularly the agitating mechanism; and Fig. 9, a plan view of one of the cages. Figs. 10 and 11 are modifications of the arrangement of the jigging levers.

In its principal features this apparatus consists of three plate-holding cages, controlled by a transferring rotating carriage, whereby each cage may be supported on a loading-table in position to receive its charge of plates, then raised and be transferred by a one-third revolution of its carriage into position to have said loaded cage deposited in a vat containing acidulated or other pickling bath, then raised from said bath and transferred by another one-third rotation of its carriage into a position to have said loaded cage deposited in a cleaning or washing bath or water-vat, each said movement of rotation operating to bring one loaded cage onto a table in position to be unloaded and reloaded, a second loading-cage to the acidulated bath, and a third loaded cage to the water-bath.

Another principal feature is in agitating mechanism, whereby each of said loaded cages when deposited in the acidulated and water baths, respectively, are effectively agitated therein.

Another such feature is the raising and lowering devices, whereby the cages are raised to free them from the vats and loading-table into position to be transferred into a new position and then lowered, one from the loading-table into the acidulated bath, another from said bath into the water-bath, and a third from the water-bath onto the table to be unloaded of its charge of cleansed plates and reloaded with a charge of plates to be pickled and washed.

Other important features are found in the means for actuating the several devices by timely movements suited to produce a regular succession of the various operations.

Inasmuch as there are three points of operation, three cages to be agitated, and three agitating mechanisms, in describing the duplicated devices in detail the letters of reference are used partly upon each of the three sets of devices in Fig. 5. The cages are rectangular in form, and are adapted to rest upon the table 1 and enter into and be moved in the rectangular vats 2 3. Each of the three cages is made up of a frame-work, consisting of bottom bars 51 52 53 54, which carry fixed upright partitions or fingers (see Figs. 1, 6, and 9) that form open cells adapted to receive packs P of the plates to be treated, which bottom bars are held laterally by crossbars 55 56, one at each end. These cages are provided at their four corners with suspending-rods 57 58 59 60, pivoted to the bottom bars, and provided at their upper ends with eyes, in which are attached lifting-chains 61 62 63 64, that suspend the cages from the levers 44 45 of the agitating mechanism. These chains pass through eyes in short plates 65 66 67 68, fixed to the transferring-carriage D, so that when it rotates in a horizontal plane it carries the cages with it. The loading and discharging table 1, the pickling bath or vat 2, and the washing bath or vat 3 are arranged in a circle, (see Figs. 4 and 5,) and their arrangement and operation is such that the three cages may be simultaneously raised high enough to clear the table and vats, as in Fig. 2, then be given a horizontal movement equal to one-third of the circular path in which they travel, and then be lowered, as in Fig. 1, the result being that one cage will be transferred from the table 1 to the bath 2, another from the bath 2 to the bath 3, and another will be transferred from the bath 3 to the table 1, the cage carrying cleaned plates arriving at the table 1, being unloaded and reloaded with plates to be treated during the time necessary to the operation of pickling the plates in vat 2 and of washing the plates in vat 3, which pickling and washing is done by means of the agitating mechanism.

The transferring rotating carriage D consists of a circular rim and central hub united together by outer and inner stay-bars, preferably made of angle-iron. (See Fig. 5.) The outer stay-bars 69 70 71 are arranged at equidistant points and both have their ends secured to the rim, and each one of the inner stay-bars 72 73 74 is arranged parallel with one of the outer stay-bars and at such a distance therefrom that each pair shall form a support for an agitating mechanism, said inner stay-bars 72 73 74 each having its outer end fastened to said rim and its inner end secured to one of its companion stay-bars, said bars being thus triangularly disposed, so as to embrace the three arms of the central hub. This transferring rotary carriage is sustained in a horizontal plane by resting upon and turning on grooved wheels 47 48 49 50, that are suitably journaled in stationary supports, its lower edge being formed into a rail properly shaped to bear in the groove of said wheels and its periphery being grooved to suit it to receive a driving band or chain 34, by which it is rotated. Each pair, consisting of an outer and an inner stay-bar, as 69 72, constitutes, with cross-plates 20 21 22 23, connecting them, a carrier for an agitating mechanism, one principal member of which is a rocking lever composed of two members 44 45, joined together as a single instrumentality by means of rods. Its function is to impart the requisite movements to the cages while they are immersed in either pickling or cleansing vats, that shall cause the plates not only to be soaked while immersed in the acidulated liquor or cleansing-water, but to be moved therein to and fro and up and down, with like movements imparted to the cage, and to be jiggered and swayed in the cells of the cage independently of the latter's compound longitudinal and vertical movements. These several movements of agitation are accomplished by peculiar mechanisms now to be described.

The driving device of each agitating mechanism is an actuating-shaft 25, that is journaled in bearings 26 27, mounted on the rails, and a bearing 28, mounted on the central hub. At its inner end this shaft 25 carries a bevel-pinion 30, constantly geared with a bevel-pinion 31, centrally fixed to the hub, and at its outer end this shaft is provided with one member 32 of a clutch. On each side of the actuating-shaft 25 parallel shafts 35 36 37 are similarly journaled in bearings mounted on the rails, the outer shafts 35 37 being provided with rotating actuating-arms 38, 39, 40, and 41, that bear upon plates 81 82 83 84, carried by the levers. The actuating-shaft carries toothed wheels 5 6, and the shafts 35 36 37 each carry like wheels 10 11, 7 8, and 12 13, the said wheels 5 10 7 12 and 6 11 8 13 constituting trains that operate the pairs of rotating actuating-arms 38 39 and 40 41, whose function is to actuate the rocking levers 44 45, from which the cages are suspended by the lifting-chains 61 62 63 64, and through which levers the described agitating movements are accomplished. These agitating movements are performed whenever an actuating-shaft 25 is clutched with the main or driving shaft 100, and whenever one actuating-shaft is rotated its movement is transmitted through its bevel-pinion 30 and the bevel-pinion 31 to the two other actuating-shafts 25 and the mechanisms which they operate, as will be readily understood.

The members 44 45 of each of the rocking levers (see Fig. 7) rest upon collars carried by the shafts 35 37, which alternately become fulcra, upon which said levers tilt or rock.

These levers are held to duty and controlled while being permitted to rise and fall, and it may be moved endwise by means of curved guides 90 91 92 93, that are supported from cross-plates that are secured to the rails, as 70 73, and between each pair of these guide-arms there extends a lifting guiding cross-rod 46, that also connects the two members of each of the rocking levers.

The actuating-arms 38 39, also 40 41, project in opposite directions from their shafts, and when rotated one set, as 38 39, operates to concertedly lift one end of the lever 44 45 (see Fig. 8) by a crank-like movement, which is at first rapid and then gradually decreases until the center of motion is reached, and then lowers said lever by a movement correspondingly increasing in rapidity, which imparts like movements to the cages, each of the said cages thus having one end raised from and returned to a horizontal position and the rocking lever performing like movements with the collars on the said shaft 37 as the fulcra for its two members, upon which fulcra their non-raised ends are maintained in proper position by the curved guides 92 93, this tilting action of the lever adding a swinging and consequent endwise motion to the up-and-down movement of the cage. At the moment when the cages and rocking lever have assumed their horizontal positions, after having been raised at one end, and while the arms 38 39 are making an idle one-half revolution the arms 40 41 come into operation and cause a similar movement to be imparted to the opposite ends of the rocking lever 44 45 and the cages, (see dotted lines, Fig. 8,) said lever then tilting on the collars of the shafts 35, as its fulcrum, governed by the curved guides 90 91, and the cage then receiving movements corresponding to those just described, but in an opposite direction. These movements are rapidly repeated, whence results a rising and falling or vertical reciprocating movement and a to-and-fro or horizontal reciprocating movement of the cage and its load en masse.

It will now be observed that in making the up and down movements the levers are raised from and lowered upon stationary seats, and that their movements in leaving and reaching said seats are very quickly accomplished, the result of which is that jerking, seating, and unseating movements permitted by the flexible character of the chains 61 62 63 64 are given to the levers and to the cages, wherefrom it also results that the packs of plates held in the cells of the cages are violently thrown about in said cells, and thus not only caused to move independently of each other up and down but sidewise and endwise, being thus jiggered or tumbled in the bath. This jigging action causes them to have violent short motions in the bath in addition to the longer and more slow general movement vertically and longitudinally in said bath and accomplishes such a combined rubbing and scrubbing action as to detach all scale and remove other imperfections most effectively. The main or driving shaft 100 is at one side of the apparatus and driven in any usual manner. It carries at one end a member 33 of a clutch and a shifting-lever 101 for causing the clutching and unclutching; and it is obvious that when the driving and actuating shafts are clutched that these agitating devices will perform as just described.

To accomplish the successive treatments on the table 1 and in the vats 2 3, the cages must first be raised, then swung horizontally, and then lowered. This is done by means of a vertical hoisting-shaft 102, that normally rests on a seat 103 and is arranged to slide vertically in floor and other bearings, one being the hub of the carriage D. This shaft 102 has three branch arms 86 87 88, (see Figs. 1, 3, and 4,) from which depend short chains 96 97 98, whose lower ends are fastened in eyes carried by the cross-rods 99 and to the upper end of which shaft a chain is attached, the free end of which passes between a pair of chain-hoisting wheels that are provided with worm-wheels driven by a worm 104 on a cross-shaft that carries two inner loose and two outer fast pulleys, onto and off from which the belts are shipped by a belt-shipper and the handles 110 111. These pulleys are driven by belts 112 113, running over a drum 120 on a counter-shaft 105, which in turn is constantly rotated by an actuating-pulley 106 and belt 108 from a band-wheel 107, driven by gearing from the main shaft. The clutch 32 33, having been uncoupled by means of lever 101, the handle 110 is moved to cause the belt 112 to shift from its loose pulley to the outer fast pulley, thus setting into operation the chain-wheels which lift the chain 99, and thus, through the shaft 102, its branch arms 86 87 88, the chains 96 97 98, the levers 44 45, chains 61 62 63 64, and rods 57 58 59 60, hoist the cages upward to a distance sufficient to enable the cages in moving horizontally to clear the vats and table. This accomplished, the handle 111 is moved to shift the belt 112 onto the loose pulley. The handle 114 is then moved to withdraw a spring-bolt 19 from its socket in a plate 29, projecting from the rim of the carriage D, by which said carriage is locked against rotation, and the several parts supporting the cages are horizontally rotated as follows: A driving-chain 34, resting in the grooved rim of the carriage D, passes over a loose clutch-pulley 89, fast upon a counter-shaft 116, that is rotated by a belt 117, running from a pulley 118 on the shaft 116 to a similar pulley 119 on the counter-shaft 105. The driving of this shaft, and hence the rotation of the carriage, is governed by the handle 120, that couples the clutch 95 with the clutch-pulley 89. When these parts have moved an appropriate distance to carry a cage from the table 1 to the vat 2, another from the vat 2 to the vat 3, and still another from the vat 3 to the table 1, the rotating movement is suspended by releasing the handle 120, whereupon the clutch 95 is withdrawn by a spring from the clutch-pulley 89, and the bolt 19 is simultaneously shot into its socket-plate 29, thus securing the position then attained. The handle 111 is thereupon operated to shift the belt 113 from its loose to its fast pulley, and the chain-wheels are thereupon rotated so as to lower the chain 99 and with it the several cages into their respective new positions upon the table and in vats 2 3. In this movement the shaft 102 is again rested upon its seat 103, whereupon the handle 110 is moved to carry the belt 113 onto its loose pulley and suspend the lowering operation. The parts are then in position to have the agitating mechanisms operate, the chains 96 97 98 being sufficiently slackened so as not to interfere with such operation. During these agitating operations the cage, then resting upon the table 1 and having its chains so slackened as not to draw upon the cage, is unloaded of its cleansed plates and reloaded with plates to be treated, the various operations described being repeated.

The apparatus thus described and operated is capable of treating large quantities of plates and pickling and cleansing them most expeditiously, thus reducing their handling to a minimum and enabling them to be produced at the lowest cost. It constitutes one of a series of machines having this object in view, and is more especially designed for treatment of plates of iron or steel that are to be coated with tin, but is obviously adapted to the pickling and cleansing of plates and other metal objects which require that operation.

It is obvious that cams may be substituted for the rock-arms 38 39 40 41, and that, like said arms, one pair would be sufficient if the bearings for them were central and suitably wide, and that in either case the downward movement of the lever might be a dropping motion to receive a maximum jar if the cam passes off or the cam is shaped to leave the bearing at or shortly after it has raised the lever to the highest point, and that this dropping movement may be varied by arranging the time at which the cam or arm leaves said bearing. Of course each end of the levers might rest in bearings rising above the lever ends sufficiently to act as stationary pivotal guides, in which case they would permit the rising-and-falling movement of the levers and cages without the necessity of employing the curved guides as a controlling means. This arrangement will act satisfactorily in many cases, and it is illustrated by Fig. 10. So, too, the modified endwise or swinging movement of the cages might be accomplished or increased in extent by employing vertically-arranged straight guides, between which the cross-rod 46 would rise vertically, and thus cause the lever ends to slide considerably upon their fulcra; but the structure shown, involving the curved guides, is regarded as suitably advantageous in cleaning metal plates that are to be coated. This is illustrated by Fig. 11.

The chains 61 62 63 64 might be omitted and the rods 57 58 59 60 be pivoted to the levers; but this would necessitate a greater hoist for transferring and is not as desirable as the arrangement shown.

It is further obvious that while we have described two vats, one table, and three cages, and a one-third movement of the carriage, the vats and cages may be more in number, with one table, and the carriage may move a fourth, a fifth, or other proportionate distance for each transferring movement. Hence such arrangement is to be considered as within the scope of this invention.

It may be further stated that while we have provided that the rocking levers shall be the medium through which the cages are raised and lowered for horizontal transference, it is feasible to connect the cages independently of said levers with the vertical hoisting-shaft. This would be accomplished by attaching the chains 98 directly to the cage for hoisting purposes, thus leaving the chains connecting the cages to the jigging levers to act, as has been described.

Many of the parts may have other devices substituted for them and still be within what is now pointed out as novel in the following claims:

We claim—

1. The combination, with a vat for containing a suitable fluid and a cage for holding the articles to be treated, of a rocking lever from which the cage is suspended, a seat for said lever, and means for raising said lever from and permitting its return to the seat, substantially as described.

2. The combination, with a vat for containing a suitable fluid and a cage for holding the articles to be treated, of a rocking lever from which the cage is suspended, seats for said lever, and means for alternately raising opposite ends of said lever from and permitting it to return to the seat, substantially as described.

3. The combination, with a vat for containing a suitable fluid for treating metal articles, of a cage for carrying said articles, a rocking lever to which the cage is attached by flexible connections, stationary seats upon which said lever normally rests, and means for rocking said lever to produce a jigging action, substantially as described.

4. The combination, with a vat for containing a suitable fluid and a cage for holding the articles to be treated, of a rocking lever from which the cage is suspended, a seat for said lever, means for raising said lever from and permitting its return to the seat, and a guide for controlling said lever, substantially as described.

5. The combination, with a vat for containing a suitable fluid and a cage for holding the articles to be treated, of a rocking lever from which the cage is suspended, seats for said lever, means for alternately raising opposite ends of said lever from and permitting its return to the seat, and a guide for controlling said lever, substantially as described.

6. The combination, with a vat for containing a suitable fluid for treating metal articles, of a cage for carrying said articles, a rocking lever to which the cage is attached by flexible connections, stationary seats upon which said lever normally rests, means for rocking said lever to produce a jigging action, and a guide for controlling said lever, substantially as described.

7. The combination, with a vat for containing a suitable fluid and a cage for holding the articles to be treated, of a rocking lever from which the cage is suspended, a seat for said lever, means for raising said lever from and permitting its return to the seat, and a curved guide for controlling said lever, substantially as described.

8. The combination, with a vat for containing a suitable fluid and a cage for holding the articles to be treated, of a rocking lever from which the cage is suspended, seats for said lever, means for alternately raising opposite ends of said lever from and permitting its return to the seat, and a curved guide for controlling said lever, substantially as described.

9. The combination, with a vat for containing a suitable fluid for treating metal articles, of a cage for carrying said articles, a rocking lever to which the cage is attached by flexible connections, stationary seats upon which said lever normally rests, means for rocking said lever to produce a jigging action, and curved guides for controlling said lever, substantially as described.

10. The combination, with a vat and a cage for holding articles therein, of a rocking lever and seats therefor, rods pivoted to the cage and connected with the lever, and means for rocking said lever first on one end and then on the other from a stationary seat, substantially as described.

11. The combination, with a vat and a cage for holding articles therein, of a rocking lever and seats therefor, rods pivoted to the cage and flexibly connected with the lever, and means for rocking said lever first on one end and then on the other from a stationary seat, substantially as described.

12. The combination, with two vats and three cages, each suspended from a rocking lever and adapted to be moved in said vats, of mechanism for raising horizontally, transferring, and lowering the cages, and means for rocking said levers to agitate said cages in their vats, substantially as described.

13. The combination, with two vats and three cages, each suspended from a rocking lever and arranged to be entered, moved in, and withdrawn from said vats, of a hoist connected to said cages, a horizontally-rotating carriage, and means for rotating the same, substantially as described.

14. The combination, with two vats and three cages, each suspended from a rocking lever and arranged to be entered, moved in, and withdrawn from said vats, of a hoist connected to said cages, a horizontally-rotating carriage, means for rotating the same, and a lock for fixing the position of said carriage, substantially as described.

15. The combination, with two vats and three cages, each suspended from a rocking lever and arranged to be entered, moved in, and withdrawn from said vats, of a hoist connected to said cages, a horizontally-rotating carriage, a chain and driving wheel, and clutch, substantially as described.

16. The combination, with two vats and three cages suspended from a horizontally-rotating carriage and arranged to be entered, moved in, and withdrawn from said vats, and three agitating mechanisms for said cages, of three actuating-shafts for said agitating mechanisms, a single driving-shaft, and a clutch for successively connecting the driving-shaft with the actuating-shafts, substantially as described.

17. The combination, with a vat and a cage for containing articles to be treated in said vat, of an agitating mechanism connected with said cage and consisting of a rocking lever, two cams or arms for actuating opposite ends of said lever, and stationary seats alternately receiving the impact of and acting as a fulcrum for said levers, substantially as described.

18. The combination, with a vat and a cage for containing articles to be treated in said vat, of a rocking lever connected with said cage, two cams or arms for actuating opposite ends of said lever, stationary seats alternately receiving the impact of and acting as a fulcrum for said levers, a train of gears for rotating the cams or arms, an actuating-shaft for moving the train, a driving-shaft, and a coupling for connecting it with the actuating-shaft, substantially as described.

In testimony whereof we have hereunto set our hands in the presence of two subscribing witnesses.

WILLIAM H. ATKINSON.
DANIEL M. SOMERS.

Witnesses:
OSCAR M. BERRY,
CHAS. A. FOSTER.